(12) United States Patent
Foggi et al.

(10) Patent No.: US 12,253,429 B2
(45) Date of Patent: Mar. 18, 2025

(54) MEASURING MACHINE FOR LENS MAPPING

(71) Applicant: VISIA Imaging S.r.l., San Giovanni Valdarno (IT)

(72) Inventors: Alessandro Foggi, San Giovanni Valdarno (IT); Luca Del Tongo, Arezzo (IT)

(*) Notice: Subject to any disclaimer, the term of this patent is extended or adjusted under 35 U.S.C. 154(b) by 174 days.

(21) Appl. No.: 18/248,241

(22) PCT Filed: Oct. 19, 2021

(86) PCT No.: PCT/IB2021/059613
§ 371 (c)(1),
(2) Date: Apr. 7, 2023

(87) PCT Pub. No.: WO2022/090867
PCT Pub. Date: May 5, 2022

(65) Prior Publication Data
US 2023/0384182 A1    Nov. 30, 2023

(30) Foreign Application Priority Data
Oct. 27, 2020 (IT) .................. 102020000025450

(51) Int. Cl.
*G01M 11/04* (2006.01)
(52) U.S. Cl.
CPC .................. *G01M 11/04* (2013.01)

(58) Field of Classification Search
CPC . G01M 11/0207; G01M 11/04; G01B 5/0002; G01B 5/20
See application file for complete search history.

(56) References Cited

U.S. PATENT DOCUMENTS 8,220,168 B2 * 7/2012 Miyashita ................ G01B 5/20
33/200
2016/0069667 A1   3/2016 Strimpel

FOREIGN PATENT DOCUMENTS

DE       29720247    1/1998
EP        2681507    1/2014
JP       S61120940    6/1986

* cited by examiner

*Primary Examiner* — Kevin K Pyo
(74) *Attorney, Agent, or Firm* — Themis Law; Franco A. Serafini

(57) ABSTRACT

A machine for measuring the optical properties of a lens for a pair of eyeglasses includes a light emitting system for emitting a light beam; a receiver arranged for receiving the light beam; an alignment system configured to align the lens according to a predetermined measuring position; a gripping system configured to grip the eyeglasses; and a supporting system on which the eyeglasses or the single lens are positioned. The alignment system is arranged at a distance from the light emitting system so that at least a lower support element is not intercepted by the light beam. The gripping system is in a closed configuration after the alignment has been performed and then a subsequent shifting of the support structure is carried out to bring the lens under the light emitting system.

14 Claims, 11 Drawing Sheets

FIG. 6
OPEN CLAMPS FOR LOADING
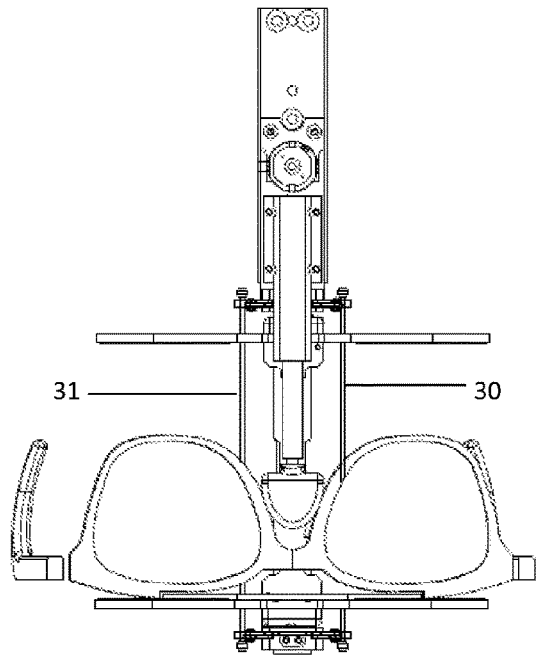
CLOSED CLAMPS
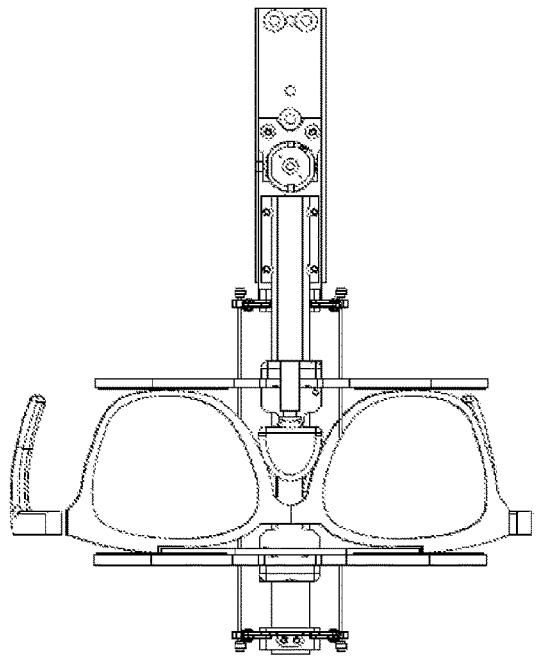
FIG. 6A
CLAMPS OPENING DURING ALIGNMENT
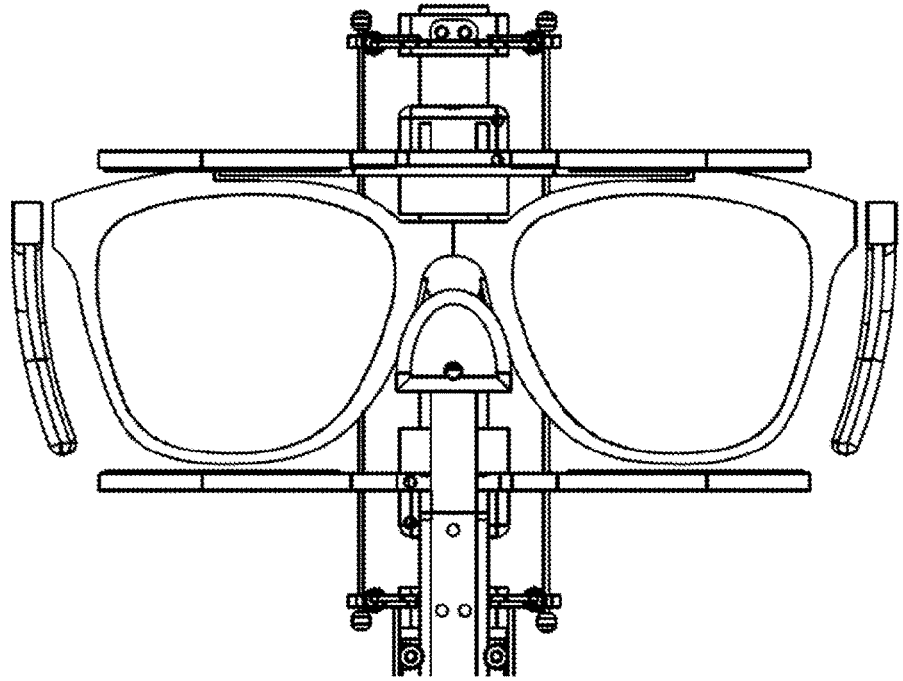

MEASURING MACHINE FOR LENS MAPPING

SCOPE OF THE INVENTION

This invention relates to the technical field concerning the measuring instruments for glasses or for a single lens, in particular the mapping of a pair of glasses or of a single lens.

In particular, the invention refers to an innovative machine capable of carrying out alignment of the lens or of the glasses in an extremely simple way and therefore with a constructively simple and functional solution.

OVERVIEW OF THE PRIOR ART

A pair of glasses, as is well known, generally consists of two lenses (which can have any gradation), the said lenses being fixed to a frame.

Then two side arms that connect to the frame to fit the glasses on the face with the side arms resting behind the ears are provided.

The frame can therefore comprise a structure in the form of a sort of mask that forms the two holes for housing the lenses. Said frame includes or itself forms a bridge which serves for resting the glasses on the top of the nose.

Alternatively, there are also glasses without a frame wherein there is only a bridge connecting the two lenses and intended in use to rest on the top of the nose, such that the glasses are not surrounded by any structural surround element.

Regardless of the type of glasses, with or without frame, machines are known in the technical field of lens mapping which allow mapping of the lens, for example for ophthalmological use. An example publication is EP2681507 in the name of Visionix Ltd.

In general, these machines provide the emission of a light beam that passes through the lens of the glasses at a point. The beam that has passed through the lens is intercepted by a receiving system that uses the well-known Hartmann matrix and, using a processor, the light beam received is then analyzed to create a mapping of the lens.

Accordingly, an element of fundamental importance is the correct alignment of the lens because the light beam that passes through the lens at one point must be perfectly orthogonal to the lens at the pass-through point, so that a precise and correct measurement can be made.

A functional and simple system of lens alignment is described in the aforementioned publication EP2681507.

The machine described in EP2681507 provides an upper part for emitting the light beam and a light beam receiving area located under said upper part.

Between the two parts (upper part and light beam receiving part), there is a system that grips and moves the lens; this system is structured with many degrees of freedom thereby, being able to carry out many combined rotation motions on different axes and shiftings that allow the glasses, once gripped, to adapt to the most suitable position for measurement.

This system cooperates with an aligner consisting of three prongs emerging from the light beam receiving area. The three prongs are thus arranged in such a way as to delimit a triangle.

This aligner is therefore coaxial to the light beam, i.e. the aligner is in the path of the light beam and is therefore intercepted and passed through by the light beam.

The glasses are then gripped by a gripping device which is part of the entire gripping and movement system and is moved in such a way as to set the measuring lens on the three prongs.

A complementary aligner element, generally formed by three prongs in opposition with the previous ones, is lowered on the aligner in such a way as to trap the lens between the prongs.

The pair of glasses as a whole, being gripped by the gripping device, can move freely to adapt according to the position required by the three prongs on which it is set thanks to the fact that the gripping and movement system has many degrees of freedom and so moves according to the glasses alignment motion.

The glasses are then gripped and borne on the three support prongs where they are aligned thanks to the motion of the gripping and movement system that follows the motion of the glasses.

More specifically, the glasses are gripped by a scissor system that traps the glasses frame. The scissor system is mounted on a front support which is equipped at the rear with a pin which rotationally inserts into a cylindrical seat in an intermediate connection support, through a bushing-pin connection. This intermediate connection support is in turn connected to a rear support through a double fulcrum system consisting of two rods, one on each side of the intermediate device, hinged at their ends and in particular one end is hinged to the side of the intermediate support, and the other end is hinged to the rear support.

The rear support is then in turn connected to a rigid vertical and horizontal shifting system.

The entire front support, and therefore the said scissor system, can therefore rotate integrally about the longitudinal axis of the coupling pin which is rotationally inserted in the intermediate support part and, thanks to the double fulcrum connection, the entire intermediate support acquires various degrees of freedom. In this way the entire front support integrally has multiple degrees of freedom since the intermediate part is movable with respect to the rear part to which it is connected.

Cooperating with said scissor system, a cable is also provided which forms part of the front support and which extends immediately under the scissor system in a fixed manner, thus forming a simple fixed supporting surface for the glasses.

Operationally, therefore, the glasses are gripped by the scissor system and guided on the three prongs for alignment, setting the lens to be measured on the three prongs. Thanks to the counter-prongs that are lowered on to the prongs, the lens remains trapped and is forced to move acquiring the alignment position determined by the three prongs on which it rests.

The gripping system, i.e. the front part, has multiple degrees of freedom thanks to the connection described above at the intermediate and rear parts and therefore the whole system can follow the lens alignment motion.

Therefore, when the lens of the glasses is gripped between the "scissors" of the front part and brought to rest on the three prongs, before being pressed down from above by the three opposing prongs that are lowered on to it, it is free to rotate and move according to various degrees of freedom as the gripping system supports all movements. In this way, the lens rests perfectly on the three prongs and therefore the area between said three prongs assumes a position which is orthogonal or substantially orthogonal to the light beam.

According to the solution described, the three prongs of the aligner are however arranged in the light beam that is emitted and below them is the receiving area of the machine that analyzes the beam.

This solution has a technical drawback.

In particular, the fact that the light beam intercepts the aligner (passing through the space comprised by the three prongs) implies that said beam can be altered, after it has passed through the lens, by areas of shadow generated by the three prongs and which also depend on the lighting conditions of the work area.

The same problem occurs with aligners of a different shape from the three prongs, for example a ring.

If the measurement is carried out in brightly lit or less lit environments and/or with artificial or solar light, this may imply that the incidence of this light creates areas of shadow, due precisely to the supporting base, that modify the light beam.

Publication EP2681507 recognizes this technical problem but suggests as a solution the selection of aligners of suitable shape and size to minimize the generation of shadows.

This solution is therefore not functional.

Furthermore, the overall system formed by the front support, intermediate support and rear support is in itself structurally complex because it is made up of many parts connected to each other in a complex way and requires an alignment solely and exclusively after the glasses have been gripped.

SUMMARY OF THE INVENTION

It is therefore an object of this invention to provide a new machine for the ophthalmology sector, which solves the aforementioned technical drawbacks.

In particular, the object of this invention to provide a machine wherein the measurement, and the relative method with which to carry out this measurement, is much more precise as it is not affected by possible areas of shadow.

It is also an object of this invention to provide a machine, relative alignment system for measuring the lens and method, which is structurally simple and functional.

These and other objects are therefore achieved with the present machine for measuring the optical properties of a lens belonging to a pair of glasses, according to claim 1.

This machine includes:
  A light emitter (150) (or light emitting system), configured to emit a light beam;
  A receiver (100) (or receiving system) arranged in such a way as to receive said light beam and able to analyze said received light beam;
  An alignment system (70, 80) configured to arrange at least one part of said glasses lens according to a predetermined measuring position, said alignment system being operable between a gripping position to perform lens alignment and a lens release position, the alignment system further cooperating with an assembly (11, 13, 14, 30, 31) configured to support the glasses during alignment;
  According to the invention, said assembly (11, 13, 14, 30, 31) is further configured in such a way as to be able to lock the glasses in said aligned measuring position, keeping the glasses in said aligned measuring position, after alignment has been completed with the alignment system which switches into the release configuration.
  Said alignment system (70, 80) is arranged a certain distance away from the emitter (150) so as not to be intercepted by the light beam emitted by the emitter in use.
  Said assembly (11, 13, 14, 30, 31) is therefore shiftable in such a way as to be able to move the said glasses locked in the aligned measuring position under the said light beam.

In this way, all the above-mentioned technical drawbacks are easily resolved.

In particular, in the case of EP2681507 the structure of the entire glasses gripping and movement system is such that alignment must be carried out exactly in the path of the light beam. In the case of EP2681507, it is in fact the entire system that moves following the motion of the glasses after alignment and if the forces that determine the alignment are released (i.e. the aligner goes into the release configuration), then the entire gripping system returns to its initial position, thus losing the alignment. In the case of EP, it is therefore necessary to keep the glasses pressed between the EP aligner 20 and the EP upper presser 25 to ensure that the entire system that locks and supports the glasses maintains the lens alignment position during the measurement. In fact, as soon as the upper presser moves away from the aligner 20, the whole system returns elastically to the starting position. This forces a measurement light beam to be fired when the glasses are still trapped between the upper presser 25 and the lower aligner 20 and therefore with a beam that can only be coaxial with the aligner, i.e. the aligner is in the path of the light beam.

In the new proposed solution, it is possible to release the aligner while keeping the aligned position crystallized. In this way it is possible to arrange for positioning of the aligner outside the path of the light beam, thereby solving all the aforementioned technical problems relating to shadow.

In this way, unlike EP2681507, the light beam will no longer be coaxial with the alignment system and therefore all the problems of shadow described above will be solved.

Advantageously, in one possible solution, the assembly (11, 13, 14, 30, 31) introduced above provides:
  A gripping system (13, 14) configured to carry out the gripping of said glasses, said gripping system being operable between an open position, in which it leaves the glasses free, and a closed position in which it grips and locks the glasses;
  A supporting system (30, 31) on which the glasses are set in use;
  A support structure (10) connected to a shifting system, preferably a shifting system that allows shifting in one or more directions in a plane (for example a shifting in the X direction and another in the Y direction in the horizontal plane (X, Y)), and on which said gripping system (13, 14) and said supporting system (30, 31) are arranged;
  According to the invention, the said supporting system is now movable independently of the gripping system.

In this way, it is advantageously possible to confer a plurality of degrees of freedom on the glasses, resting thereon in use, following activation of the alignment system (70, 80) and with the gripping system placed in an open configuration.

It is therefore possible to align the lens, or that portion of the lens included in the aligner, through a simple mobile supporting system while the gripping system is in the open position.

This allows a constructively simpler solution to be obtained, while also allowing the glasses to be aligned outside of (or at a distance from) the path of the light beam.

This therefore means that the alignment system is placed away from the light beam path and is not intercepted thereby.

Unlike EP, in the solution proposed here, the alignment is entrusted to the mobility of the supporting system, mobility which is independent of the gripping system which, on the other hand, remains stationary and in the open position. In this way it is possible to proceed with an alignment and then with a subsequent activation of the gripping system which thus locks the glasses in the aligned position.

At this point it is evident that it is no longer necessary to carry out the measurement, and therefore to send the light beam, in the position in which the alignment system is set up, being able instead to easily shift the lens locked in its aligned position to any other position away from the alignment system, for example by rigidly shifting the whole towards a measuring zone located a certain distance away from the alignment system.

According to what has been said above, therefore, the said alignment system is now placed a certain distance away from the emitter in such a way that at least the lower support element is not intercepted by the light beam emitted by the emitter in use.

According to this solution, therefore, at least the lower support element is therefore not in the path of the light beam.

Preferably, therefore, the entire alignment system composed of the lower element (or lower presser) and the upper element (or upper presser) is outside of, that is, it is not intercepted by, the light beam.

Advantageously, said alignment system therefore comprises a lower element (70) (or lower presser) on which the lens is set in use and an upper element (80) (or upper presser) and of which at least one of said lower element and said upper element is movable towards the other in such a way as to trap the lens between them, carrying out its alignment.

A movement and locking system for a machine suitable for measuring the optical properties of a lens belonging to a pair of glasses is therefore also described, said system comprising:
- A gripping system (13, 14) configured to carry out the gripping of said glasses, said gripping system being operable between an open position, in which it leaves the glasses free, and a closed position in which it grips and locks the glasses;
- A supporting system (30, 31) on which the glasses are set in use;
- A support structure (10) connectable to a shifting system of the machine and on which said gripping system (13, 14) and said supporting system (30, 31) are arranged;
- According to the invention, said supporting system is independently movable away from the gripping system.
- Advantageously, in this way it is possible to confer a plurality of degrees of freedom on the glasses, resting on said supporting system in use, when the gripping system is in an open configuration.

As indicated above, it is therefore possible to have the system mountable on pre-existing machines or to produce a machine that includes this system.

Advantageously, in all cases, i.e. both in the case of the system and that of the machine, said supporting system comprises at least one first cable (30) and at least one second cable (31) arranged a certain distance away from each other in such a way as to form a support for the glasses.

Advantageously, said first and second cables are connected to a kinematic mechanism configured in such a way that said first and second cables are movable, preferably shiftable along a curved arc, independently of each other allowing said alignment, after the alignment system has been activated, when the gripping system is in said open configuration.

Advantageously, in all cases, i.e. both in the case of the system and in that of the machine, said kinematic mechanism includes:
- A first pair of levers each one hinged rotatably at one end thereof to a fixed point and, at the opposite end, each one of said levers of the first pair being connected to a point of the first cable in such a way that said first cable extends between the two levers of said first pair of levers and movable following a rotation of each one of said levers of the first pair, and in which are further included elastic means arranged in such a way as to elastically recall each one of said two levers of the first pair to a raised position;
- A second pair of levers each one hinged rotatably at one end thereof to a fixed point and, at the opposite end, each one of said levers of the second pair being connected to a point of the second cable in such a way that said second cable extends between the two levers of said second pair of levers and movable following a rotation of each one of said levers of the second pair, and in which are further included elastic means arranged in such a way as to elastically recall each one of said two levers of the second pair to a raised position.

Advantageously, in all cases, that is, both in the case of the system and in that of the machine, the two levers of the first pair are placed apart from each other and independent so that each one can rotate independently of the other and in which the two levers of the second pair are also placed apart from each other and independent in such a way that each one can rotate independently of the other.

Advantageously, said first pair is hinged to a support block (50), in turn fixed to the support structure, or alternatively the pair is fixed directly to the support structure.

In any case, said first pair of levers protrudes outside of a side of the support structure.

In the same way, the second pair is hinged to said support block (50), in turn fixed to the support structure, or it is fixed directly to the support structure in such a way as to protrude outside of the opposite side of the support structure.

Advantageously, in all cases, i.e. both in the case of the system and in that of the machine, said elastic means comprise an elastic spring for each one of said rods of the first and second pair.

Advantageously, each spring is connected at one end to a fixed point and at the opposite end to said rod in such a way that, following rotation of said rod, the spring extends, generating a recall force.

The fixed point can be in the form of a further fixed rod which is permanently connected to a part of the structure, for example the support block itself (50).

Alternatively, the spring can be of the torsional type so that it is applied in the rod's hinging area.

In this way the fixed rod is not necessary.

Advantageously in all cases, i.e. both in the case of the system and in that of the machine, the said gripping system (13, 14) comprises a first and a second plate placed one in front of the other on the support structure and in which at least one of said two plates is shiftable on said support structure in such a way as to be able to move towards/away from the other plate.

Advantageously, in all cases, i.e. both in the case of the system and in that of the machine, movement means are provided to actuate the at least one plate according to said shifting motion, said movement means comprising an electric motor which rotatably drives a toothed wheel, said toothed wheel engaging with a rack fixed to said plate in such a way that, according to the direction of rotation of said toothed wheel, a shifting of said plate is produced in one direction or in the opposite direction.

Alternative drives can however be provided, such as worm screw systems.

Advantageously, in all cases, i.e. both in the case of the system and in that of the machine, both plates are movable.

In this case, a first rack connected to one plate and a second rack connected to the other plate are provided and in which said toothed wheel simultaneously engages with both racks in such a way that its rotation in one direction causes mutual separation of the plates and the rotation in the opposite direction causes the two plates to approach each other.

As mentioned, a worm solution could also be implemented.

Advantageously, therefore, a control system can be included which is programmed to lead the gripping system into the closed configuration only after the alignment has been completed and then to carry out the subsequent shifting of the support structure to guide the glasses lens under the light beam emitter.

Advantageously, said control system is therefore programmed to operate said actuation of the alignment system and carry out said alignment when the gripping system is in said open configuration and then carry out, after the alignment has taken place, the actuation of said gripping system in the closed configuration to lock the glasses in the aligned measuring position and perform said subsequent shifting of the support structure to guide the glasses lens or the single aligned lens under said emitter.

Also described here is a method for measuring the optical properties of a lens belonging to a pair of glasses and comprising the steps of:

Aligning the glasses lens through an alignment system (70, 80) in such a way as to arrange at least one portion of the glasses lens in a measuring position;

Shifting the glasses, while keeping them aligned for measurement, to a measurement area located a certain distance away from the alignment system;

Generating a beam which intercepts the lens of the glasses constrained in said measurement position and with the light beam which is away from the alignment system in such a way that said light beam does not intercept said alignment system.

Advantageously, the following phases are provided:

Arrangement of a support structure connected to a shifting system in such a way that the entire support structure can move at least in one horizontal plane (X, Y), on said support structure there being a gripping system, configured to carry out the gripping of said glasses, and a supporting system (30, 31) configured to support the glasses, said gripping system being operable between an open position, in which it leaves the glasses free, and a closed position in which it grips and locks the glasses, said supporting system being movable independently of said gripping system in such a way as to enable a plurality of degrees of freedom on the glasses, resting thereon in use, when the gripping system is in an open configuration;

The method providing the phases of:

Setting of the glasses on said supporting system and arrangement of the gripping system in an open position in which the glasses are free to move according to various degrees of freedom with respect to the gripping system;

Alignment of the glasses through the activation of an alignment system trapping the lens to be aligned between a lower element (70) and an upper element (80) in such a way as to cause, after it has been trapped, an alignment movement of the lens through a movement of the supporting system that follows the movements of the lens;

Locking of the glasses in the aligned position by activating the locking system in the closed position;

Subsequent shifting of the supporting system in such a way as to shift the lens to be measured under a light beam which is placed a certain distance away from the alignment system so as not to intercept said alignment system.

Advantageously, this operation can be repeated N times on the same lens by carrying out N alignments of different portions of said lens and N measurements of these aligned portions, thus creating a precise mapping of the whole lens.

Also described here is a method for aligning a single lens with a machine comprising a support structure (11) connected to a shifting system in such a way that the entire support structure can move at least in one horizontal plane (X, Y), at least one gripping system being provided on said support structure, configured to carry out the gripping of said single lens, said gripping system being operable between an open position, in which it leaves the single lens free, and a closed position in which it grips and locks said single lens;

The method providing the phases of:

Setting of the lens on a lower presser (70) of an aligner (70, 80) and alignment by locking the lens between said lower presser and an upper presser (80);

Gripping of the single aligned lens through said lens gripping and releasing system by the lower and upper pressers of the aligner;

Shifting of the lens to the measurement position in which the light beam that intercepts the lens is emitted and with the light beam which is away from the aligner in such a way that the aligner is not in the path of the light beam.

Advantageously, at the end of the process described above, the lens is unloaded, i.e. the gripping system returns the lens to its initial loading position and the operator can remove it.

In the same way, advantageously, in the case of glasses, once the measurement of one lens of the glasses has been completed, the machine still returns the system to the initial loading position and performs the measurement of the other lens.

In some cases the machine can be programmed to carry out in succession a mapping on a single lens of a series of glasses, for example the right lens. In this way, the result of all the right lenses of the glasses measured is entered in a report, to then enable the same measurement, if necessary, on the left lenses.

In the present description, the term alignment means the predisposition of the lens in the measurement position in which, therefore, the area of lens contained in the space circumscribed by the aligner (area contained in the space circumscribed by three prongs in the case of a three-prong aligner) is orthogonal or substantially orthogonal to the light beam.

In a further variant of the invention, therefore, there would be nothing to exclude the possibility of using, for example, a system such as the one described in EP in which a system is integrated which locks the entire gripping unit in the correct aligned position, thus allowing its shifting while maintaining this aligned position once the alignment system releases the lens.

BRIEF DESCRIPTION OF THE DRAWINGS

Further characteristics and advantages of this system and relative method, according to the invention, will be clarified with the description that follows of some of its embodiments, provided by way of non-limiting examples, with reference to the attached drawings, where:

FIGS. 6 and 6A are top views relating to the clamp and the gripping and releasing condition for loading glasses; FIG. 6A, on the other hand, always shows an open clamp condition during activation of the alignment system in which the opening gap is minimal, i.e. of the order of a millimeter but sufficient to free the glasses from the grip so that the aligner can move the glasses and bring them into the measuring position;

DESCRIPTION OF SOME PREFERRED EMBODIMENTS

Figure 1:
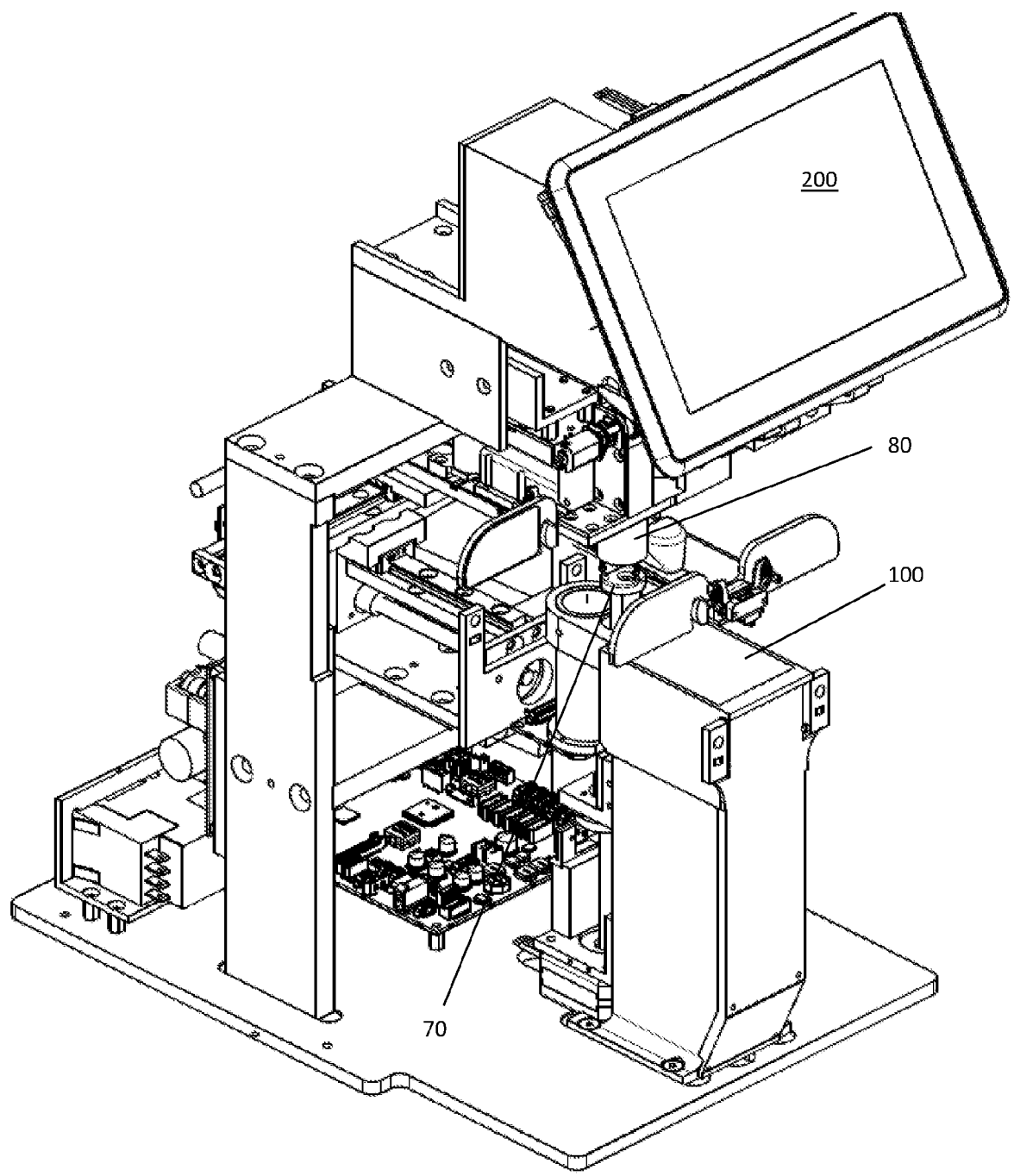
FIG. 1 shows an overall axonometric view of the machine according to the invention.

FIG. 1 shows an overall view of the machine (or machinery) according to the invention.

Figure 2:
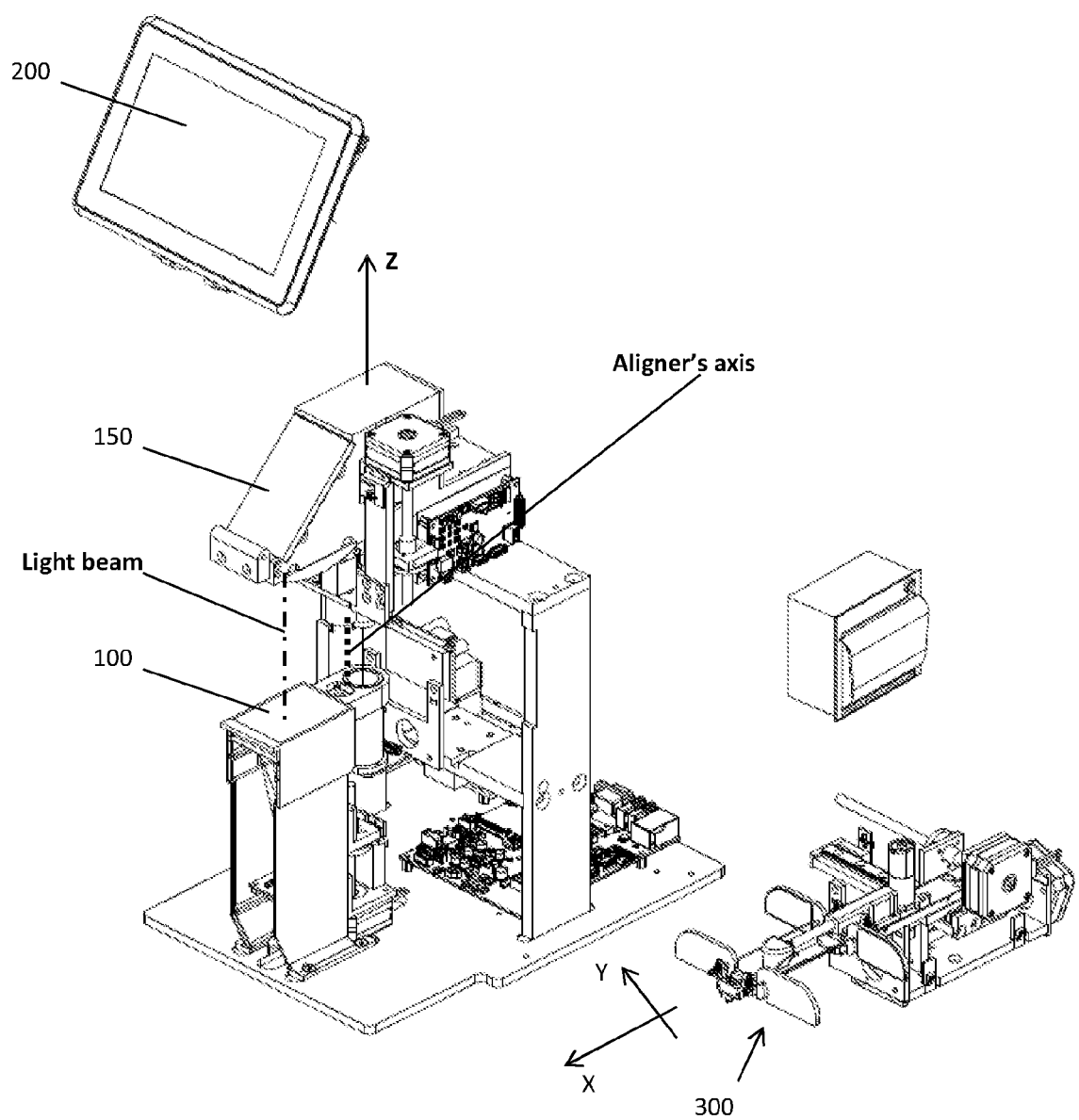
FIG. 2 shows an axonometric view with some parts of the machine in exploded view.

FIG. 2 is an exploded view of some parts of the machine of FIG. 1, to better highlight certain parts of same.

The machine obviously has a frame, or bearing structure, on which its components described below are arranged.

With reference to the aforementioned figures, a screen 200 is therefore provided, preferably of the "touch-screen" type, through which to operate and/or control the functions of the machine.

As shown in the exploded view of FIG. 2, a zone 150 is therefore provided which comprises a light emitter 150 which, according to the known art, is configured to emit a light beam for measurement.

FIG. 2 shows the light beam in dashed line.

The emitter is arranged above a receiver (100) so that the light beam strikes the receiver.

The receiver comprises a "Hartmann plate" and therefore includes a processing unit suitable for processing the light beam received and which has passed through the lens to be measured, in such a way as to carry out the measurement according to the prior art.

In particular, the Hartmann plate defines a plane. This invention is also applicable in the case of the much more expensive "Shack-Hartmann" sensor (instead of the micro holes as in the Hartmann plane, there is a lenslet array). Therefore, according to this invention, the machine can include a measuring system, for example of the Hartmann plate type or of another kind, such as for example a system of the Hartmann-Shack sensor type.

In accordance with the invention, a glasses gripping and movement system 300 is now provided which is structurally simple and allows the glasses to be aligned in an area away from the receiver, thus solving the problems of the prior art discussed.

With reference to FIG. 2, therefore, the aforementioned gripping and movement system 300 is shown, is described in detail below and shown separate from the rest of the machine for clarity's sake.

The system 300 is composed of a support structure for example in the form of a plate 11 (of metal, for example), on which the components of the invention are fixed, in particular:

A gripping system (13, 14) configured to carry out gripping of a pair of glasses;

A supporting system (30, 31) on which the glasses are set in use;

These components are described in detail below.

Figure 3:
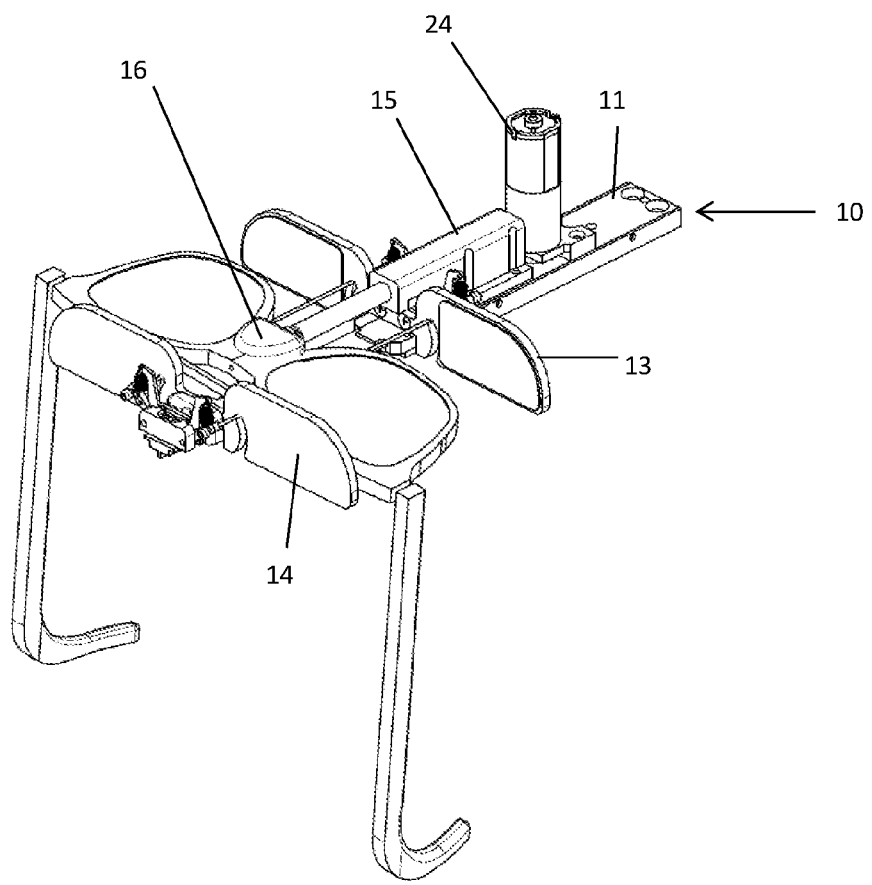
FIGS. 3 to 5 are some overall axonometric views of the system (or unit) used to grip and allow alignment of the lens before shifting the lens into the measurement position.

The Gripping System:

Going to FIG. 3, the gripping system consists of a pair of pushers (13, 14) in the form of two plates opposite each other and shiftable along the support structure 11 in such a way as to be able to approach and/or move away from each other.

FIG. 3 then shows a pair of glasses arranged between said two plates (or clamps) when these two plates are in an open position so that the glasses are still free.

FIG. 6, in a top view, shows for greater clarity the two clamps in the open position as shown in FIG. 3 and in the closed position wherein the frame (i.e. the so-called "rim") of the glasses is gripped between the clamps.

Also on the support structure there is a sliding channel 15 (visible in section in FIG. 7A) within which a rod 15' is slidably placed, ending in an endpiece 16.

The endpiece is preferably connected to the rod in an integral way so that there is no relative motion between the two parts.

Inside the channel 15 there is a spring (M) which pushes said rod, and therefore also the endpiece, towards the outside of the sliding channel in such a way that the endpiece can press on the glasses, guaranteeing a greater sealing between the clamps and at the same time uniquely defining the sagittal plane of the glasses.

In fact, the endpiece is shaped precisely to fit into the bridge of the frame and in this way ensures the definition of the sagittal plane (see, for example, FIG. 6).

Figure 5:
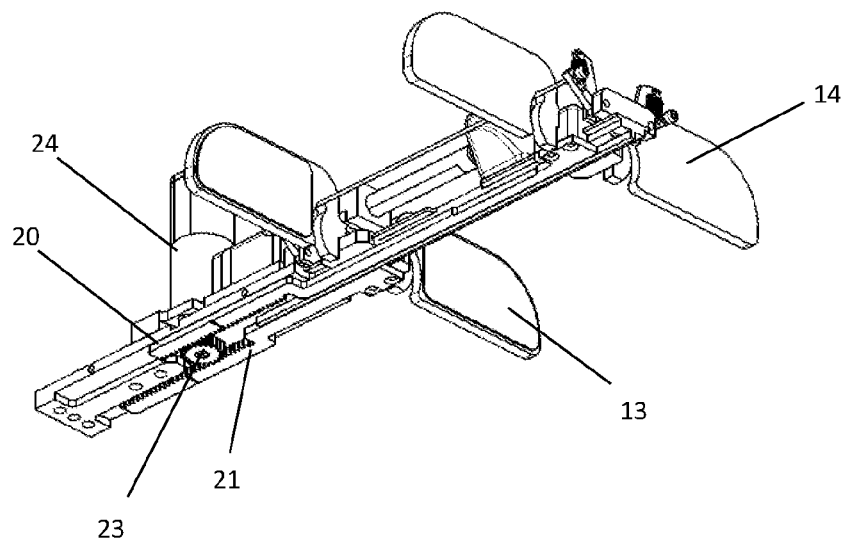

As shown in FIG. 5, the image shows the system which allows the movement, in particular shifting, of the two opposing plates forming the clamps.

In particular, as shown still in FIG. 5, a first rack 20 is provided connected to the support structure 11 in correspondence with the lower face (in fact, FIG. 5 is a bottom view relative to the support structure). The first rack connects to the first plate (or clamp) 14.

A second rack 21 is then provided which, as shown again in FIG. 5, is connected to the second plate 13 (or clamp).

Finally, a toothed wheel 23 is provided which is rotated by an electric motor 24 in one direction or in the opposite direction.

In this way, the rotation of the toothed wheel commands, through the rack, a movement of the clamps which can thus move towards each other or reciprocally away from each other.

The clamps can therefore be controlled, through a suitable control system, in such a way that they can open until the frame of the glasses is released or close until they lock the frame with a certain clamping force.

The frame of the glasses can obviously be of different sizes and/or shapes from one occasion to the next, depending on the glasses that are being measured with the machine. The stroke of the clamps, corresponding to a grip of the frame or a release of the frame, changes according to the glasses being measured (the glasses can be large, small, glasses for adults or for children).

For this purpose, a system can easily be implemented which detects the frame reaching the gripping and releasing positions in various ways.

For example, in one possible solution, the current absorbed by the motor can be detected since, when the glasses starts to be tightened, it obviously increases, thus providing a current cut-off which indicates that the gripping has been achieved.

Once that current absorption value has been reached, the system disconnects the current and the motor stops as it has reached the desired tightening value.

Well below the cut-off, the condition is therefore that of lens release.

Also provided on said support structure is a supporting system described below.

Figure 4:
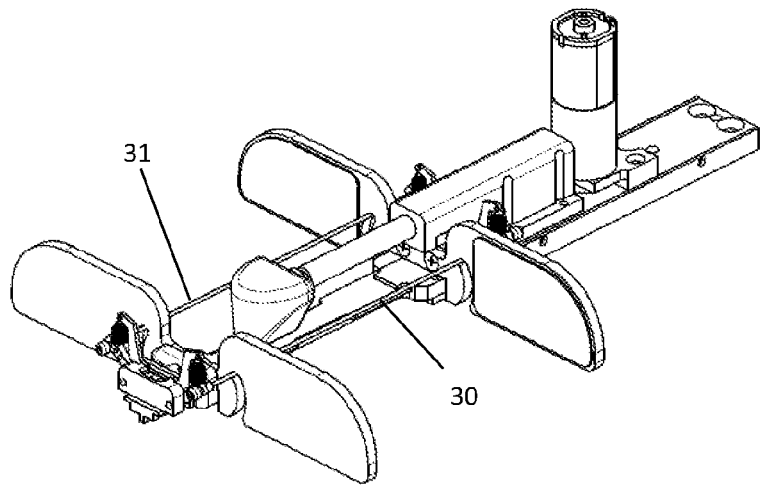

The Supporting System:

The supporting system is formed by two cables (30, 31) extending as shown, for example, in FIG. 6 and in FIG. 4. With reference to FIG. 4 or 6, a first cable is provided which extends along one side of the support structure 10 while a second cable 31 is provided along the opposite side of the support structure.

Each of said two cables (30, 31) extends between two fixing points, thanks to rods hinged around a rotary fulcrum.

Figure 8:
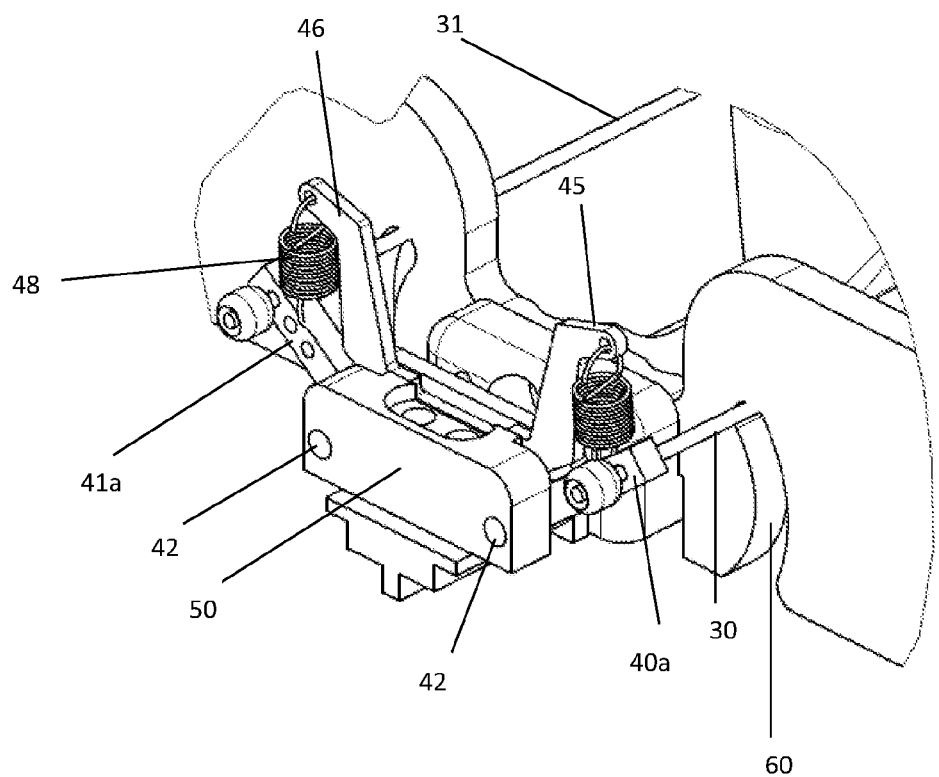
FIG. 8 shows a detail concerning the kinematic mechanism of the cables that support the glasses in order to confer on the glasses their degrees of freedom.

The detail of FIG. 8 better shows the construction details of this solution.

Figure 7:
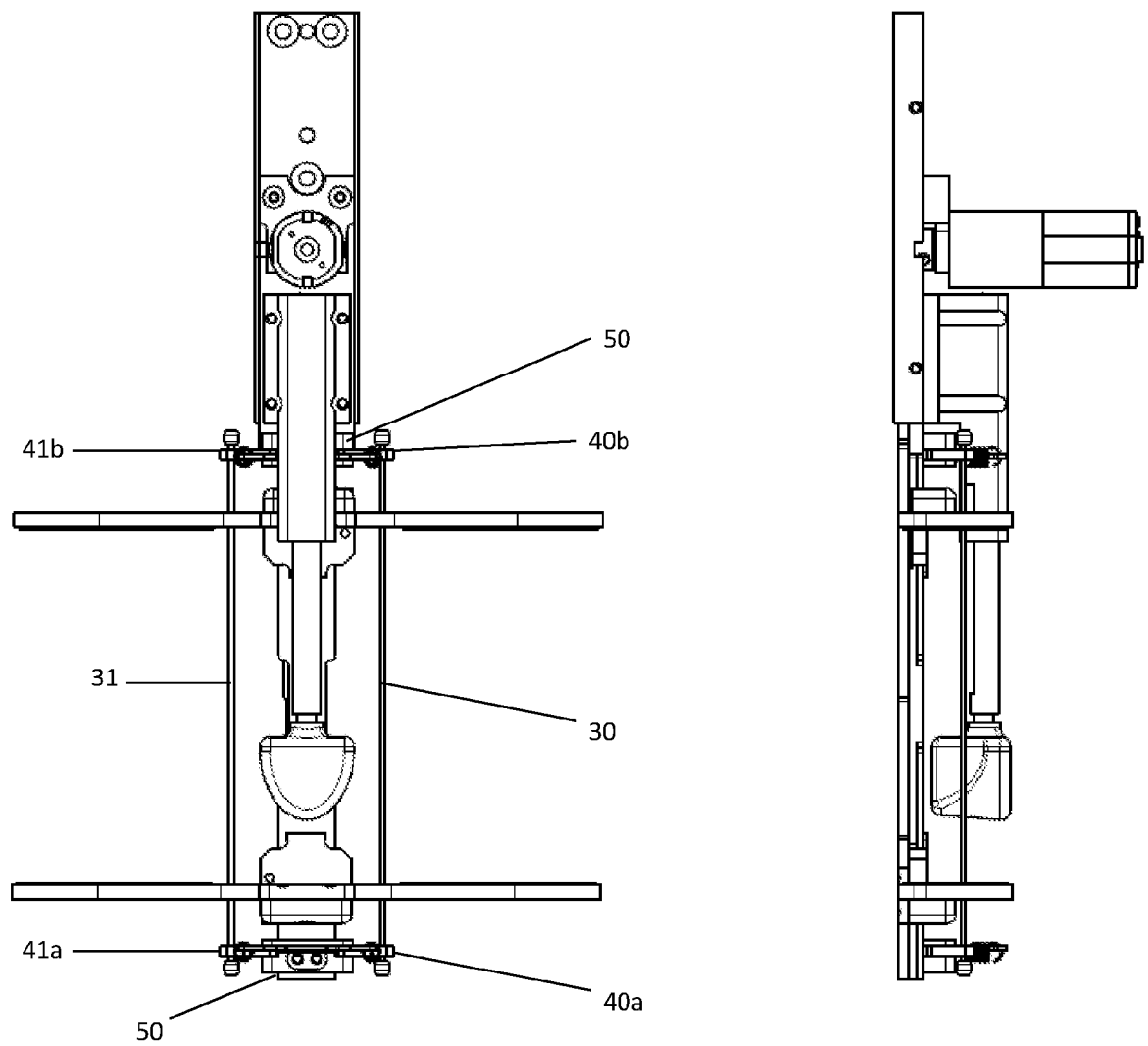
FIGS. 7 and 7A are further top and side views.
Figure 7A:
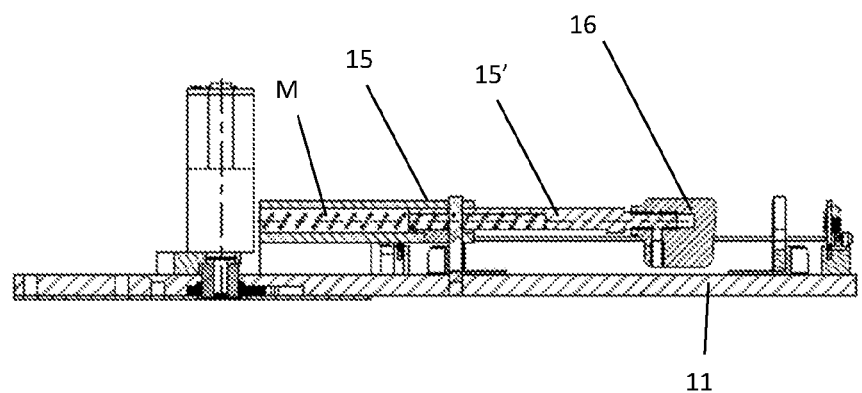

In practice, with reference to FIG. 7, a first and a second rod (40a, 40b) are provided, arranged at a certain distance one in front of the other on one side of the support structure and hinged in order to be able to rotate about their fulcrum. The cable 30 extends between said two rods.

The same happens for the cable 31 on the opposite side and extending between a first and second rod (41a, 41b) arranged at a certain distance one in front of the other and hinged in order to be able to rotate about their fulcrum.

FIG. 8 therefore shows in an enlarged view the rod 40a and 41a (therefore the front part but the same happens for the rear part relative to the rods 40b and 41b) which, in this preferred solution, are hinged to a support 50 fixed in turn to the supporting system.

FIG. 8 shows the rotation hinge 42 used for all said hinged rods (both front and rear).

The front part relating to the support 50 and rods (40a, 41a) (shown in FIG. 8) is, as said, substantially specular to the rear part, so that the description of the front part is the same for the rear part.

Again with reference to FIG. 8, the fixed support 50 had a further rod 45 on the side of the rod 40a and a rod 46 on the side of the rod 41a.

These rods 45 and 46 are fixed to the structure 50 (therefore not rotating) and with a length such that, by their end, they are at a greater height than the rods (40a, 41a).

These fixed rods are used to connect an elastic spring 48 to the relative revolving rods.

The spring is connected by one end to the rod 41a and by the opposite end to the fixed rod (the same is obviously the case for the rod 40a, as can be seen from FIG. 8) and therefore the spring tends always to recall the revolving rod towards the fixed rod.

For the connection of the spring to its revolving rod, holes may also be provided at different distances which would therefore allow different positioning, thus allowing the recall force to be adjusted at different values.

The solution proposed in FIG. 8 therefore allows the rotating rod (40a, 41a) to rotate moving from the position close to the fixed rod towards the supporting system 11 (rotation, for example, anticlockwise with reference to the rod 41a in FIG. 8) and then elastically return to the rest configuration of FIG. 8, in which the rod 41a is close to its fixed rod as it is recalled to this position by the spring once the force that has led the rod in rotation away from the fixed rod has been released.

The same solution applies also for the rear rods (40b, 41b).

In this way, it is therefore clear that each cable segment (30, 31), in this case two cables, namely cable 30 and cable 31, have their two ends that can move independently of each other.

In particular, each end of a cable can travel along a curved path 60 determined by the rotation of the relative revolving rod to which it is connected.

In this regard, in fact, FIG. 8 shows how each plate 13 and 14 has a curved-shape notch 60 which allows the wire to move following the rotary path of the rotating rod to which it is connected.

Thanks to this particularly simple solution, when the glasses are placed on the two cables, as shown, for example, in FIG. 6, it remains suspended and supported thereby and, thanks to this movement of the cables, as they are connected to a mobile kinematic mechanism, the glasses can have multiple degrees of freedom that allow them to be aligned through the aligner system.

Each rod end (40a, 40b; 41a, 41b) can therefore move along a curved path independently of the other end and each cable is mobile independently of the other.

This gives great flexibility to a system which thus grants multiple degrees of freedom without necessarily having to structure the entire gripping unit in several moving parts.

In fact, as clarified in the operation below, the clamps (13, 14) have only a shifting motion with respect to the supporting system to which they are connected but they do not rotate nor do they allow any degree of freedom. They simply shift to grip and release the glasses.

The cables, on the other hand, shift along a curved path with respect to the support structure to which they are fixed by means of the aforementioned rotating rods.

In practice, the degrees of freedom of the glasses are obtained from the support in the form of the cables connected to their kinematic mechanism which allows each end of the cable to be moved according to a curved or substantially curved linear path.

In particular, the portion of lens to be aligned between the lower and upper alignment presser, the portion resting on the cables, has all the possible degrees of freedom as it is supported by the cables.

Obviously, other parts of the glasses away from the aligner area can also rise off the cables, without this generating problems of any kind.

The cable path can be considered substantially linear along a curved path even if the cable is not a perfectly rigid element. The cable is in fact endowed with a minimum of flexibility such that its motion due to deformation and the rotation of the rods to which its ends are connected results on the whole in a motion that is not perfectly curved linear, but is in any case such that it can be considered linear along a curved path.

The construction material of the cable is preferably metallic.

In a possible variant of the invention, the spring 48 can be replaced with a torsional spring directly applied at the hinge of each rod in such a way that, depending on the direction of rotation of the rod, it twists, thus accumulating energy which it releases for bringing the rod back to its initial position. According to this variant, the fixed rods (45, 46) can therefore be eliminated, resulting in a constructively simpler solution.

The Support Structure 10:

The support structure is in the form of a rigid metal plate 11 which connects to a shifting system of the machine and which rigidly supports the structures described above. In this way, by shifting the support structure, the supporting system consisting of the cables described and the gripping system consisting of the clamps described above are rigidly shifted.

More in detail, going to FIG. 2, the entire gripping and alignment system 300 (formed precisely by the support 11 on which clamps (13, 14) and cables (30, 31) are arranged) is connected to sliding rails of the machine which allow the entire unit 300 to shift in an X and Y direction, allowing it to shift along the horizontal plane.

A shifting along the Z axis is not excluded even if, in the preferred solution of the invention, this is not essential since the motion along the Z axis is performed by the alignment system described below.

The shifting along the plane (X, Y) allows a movement of the glasses into the alignment area and then into the measurement area.

Figure 9:
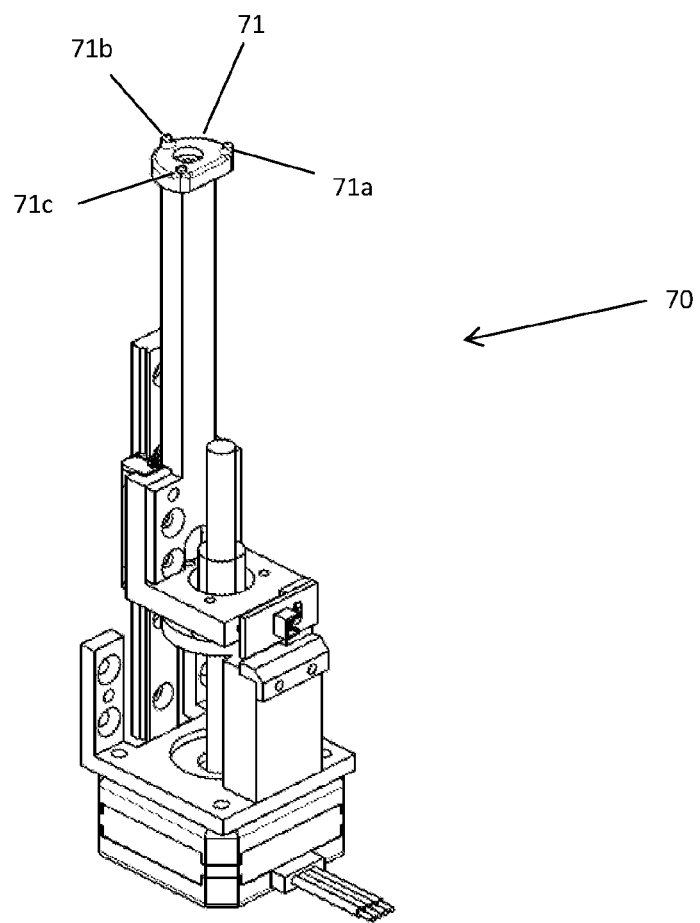
FIGS. 9 and 10 show the aligner which cooperates with the cables 30 and 31 to align the lens of the glasses.
Figure 10:
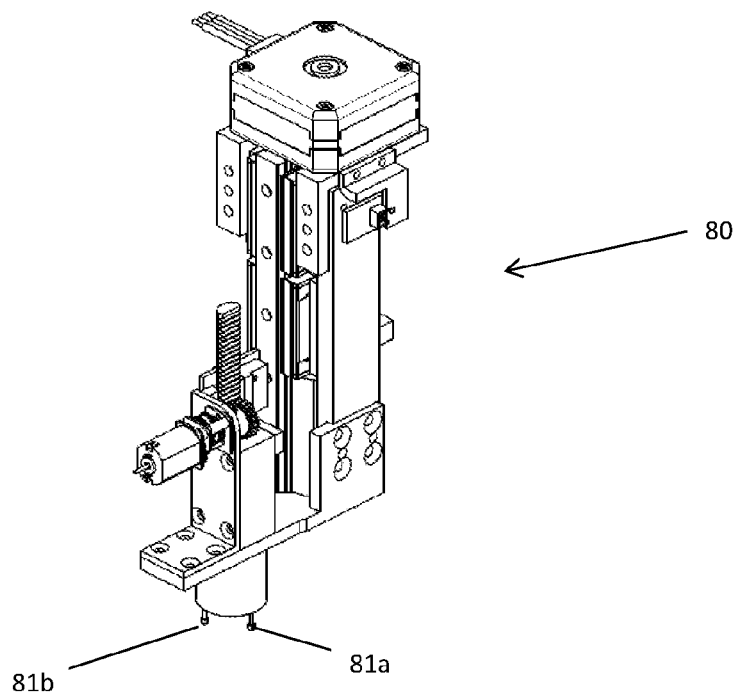

The Alignment System:

The alignment system is similar to that described in the prior art and is shown in FIGS. 9 and 10.

In particular, as shown schematically in FIG. 9, there is a lower pusher 70 and, on its same axis, an upper pusher 80 at the top.

The lower pusher forms a support element 71 on which the glasses are placed as in the known art. The support surface is preferably formed by three prongs (71*a*, 71*b*, 71*c*) arranged to delimit a triangle even if other shapes (for example a ring instead of three prongs) could be used.

As already known, the use of three prongs allows a support to be defined which, in fact, determines a perfect alignment of the lens such that the measurement light beam entering the area of the lens delimited by this triangulation of prongs is a beam substantially orthogonal to the lens area delimited by said three prongs (i.e. in the triangulation area).

The upper pusher 80 is formed by three prongs (81*a*, 81*b*, 81*c*) arranged in such a way as to overlay the three aforementioned prongs, thereby trapping the lens between them.

Upper and lower pusher are arranged in the machine in an area away from the measuring area and move reciprocally towards each other according to a direction orthogonal to the horizontal plane.

FIG. 2 in fact shows, for clarity's sake, the axis of the light beam and the longitudinal axis that connects the lower and upper pusher of the aligner. It can be clearly seen that the light beam does not intercept the alignment system and that both are at a distance from each other.

Upper and lower pusher are therefore arranged in the machine in an area away from the measuring area and they move reciprocally towards each other according to a direction orthogonal to the horizontal plane (X, Y), i.e. along the Z axis.

FIG. 9 shows the lower pusher movable along the Z axis and FIG. 10 shows the upper pusher 80 also movable along the Z axis in such a way as to be able to approach and move away from each other.

Figure 11:
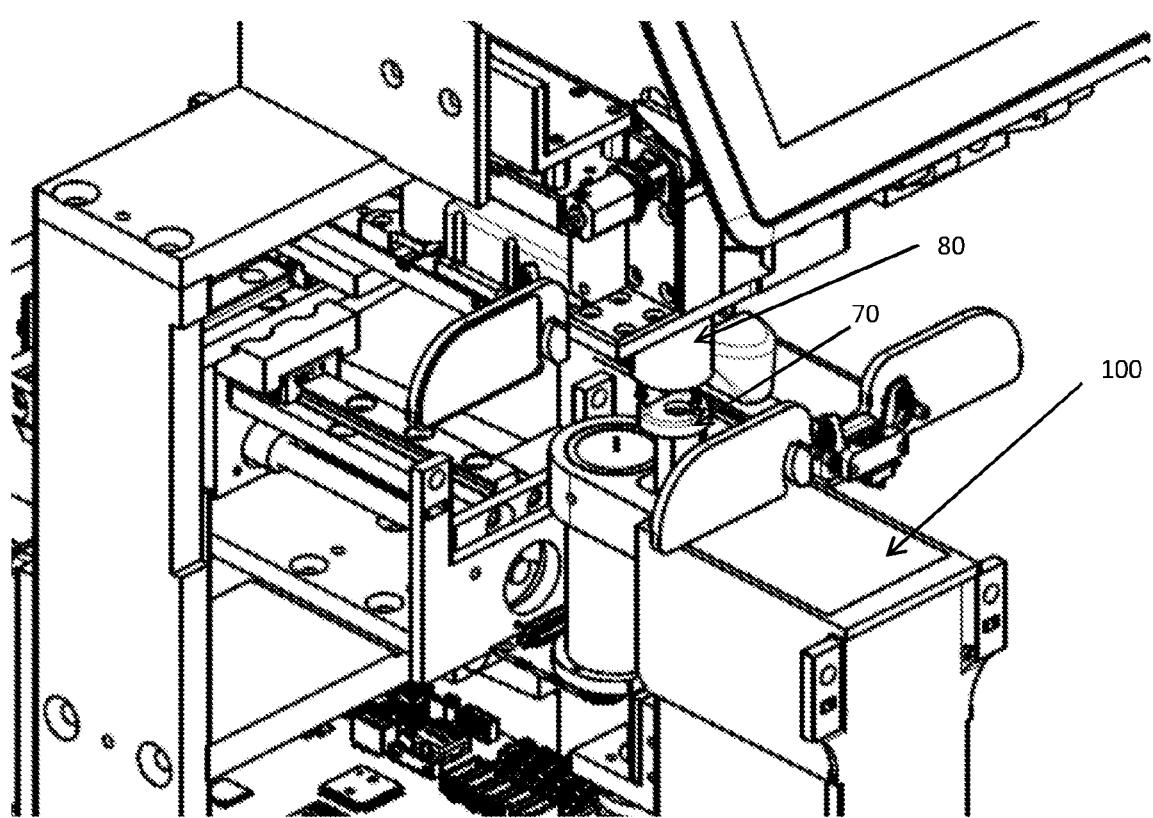
FIG. 11 is a further overall view of the machine.

FIG. 11 further shows very clearly the positioning of the pushers 70 and 80 forming the aligner and placed at a distance from the measuring plane 100 and therefore arranged outside of the light beam.

In the preferred configuration, the pushers are both movable in such a way as to approach and move away from each other.

An electric motor can provide their motion.

However, there is nothing to exclude a solution wherein only one of them moves towards the other, for example the lower one 70 fixed as in the known art and the upper one 80 which shifts in a motion of approaching/moving away from the former.

In this case, however, it would be necessary to implement a movement of the unit 300 along the Z axis.

Operation:

In use, therefore, the machine works as follows:

A suitably programmed control system controls all movements and the operation described below.

The glasses are placed on the two cables (see for example FIG. 6—"clamps open position") between the clamps open in the loading position.

During this phase the clamps are therefore open as shown in FIG. 6 and the operator shifts the endpiece backwards by hand in such a way as to position the glasses. The endpiece moves towards the bridge of the glasses thanks to the spring, defining the sagittal plane.

At this point, the machine is switched on and the measurement takes place automatically.

The system 300 shifts in such a way as to position the lens to be measured above the lower pusher 70 that is part of the alignment system.

The clamp can close, even only partially, during shifting to prevent the glasses from accidentally falling.

During this shifting movement, therefore, the clamps are preferably closed in order to hold the glasses firmly, preventing them from falling and uniquely defining the position of the glasses.

The entire unit 300 therefore shifts in such a way as to bring the lens to be measured in correspondence with the aligner (70, 80) and therefore in the space between the two overlaid pushers.

At the time of alignment, i.e. when the two pushers 70 and 80 move towards each other to trap the portion of lens between them (or in any case before alignment), the clamps (13, 14) open sufficiently to free the glasses (see FIG. 6A—clamps open during alignment) and the glasses are held in position only by the endpiece 16 of FIG. 1 which pushes them elastically against the plate 14 while the rear plate 13 is at a sufficient distance to leave the glasses free (generally, in this case, the distance is of the order of a millimeter).

FIG. 6 shows, for clarity's sake, an opening which is that for loading of the glasses, therefore with the clamps a great distance apart.

FIG. 6A also shows an open position of the clamps (therefore of release for the glasses), but during the alignment of the lens when the aligner is operated, i.e. with a gap between the clamps and the frame which is preferably, but not necessarily, of the order of a millimeter and in any case sufficient to free the glasses and allow them to move under the action of the aligner.

Clamps 13 and 14 can be coated on the part that comes into contact with the glasses with soft anti-wear and/or non-slip material such as rubber or plastic.

The rear clamp is drawn back and therefore, in actual fact, by applying pressure to the lens, the glasses suspended on the cables can move.

The support cables are, in fact, connected to independent rods that rotate between a raised position and a lowered position and wherein the return to the raised position is operated by elastic means (for example, a torsional spring or a traction spring) when the elastic recall force exceeds that which caused the rotation of the rod.

During this alignment motion of the glasses, the suitably shaped endpiece slides on the frame structure without impeding its free movement to reach the position imposed by the aligner.

The alignment is then carried out by moving the lower and upper pushers 70 and 80 towards each other such that the three prongs face each other, trapping the lens between them and perfectly aligning that portion of lens delimited by these three prongs.

In fact, by placing the lens on the three lower prongs, obviously while the glasses are supported by the cables, and then pushing on the lens with the three upper prongs, then the glasses move to alignment while resting on the cables, such cables, thanks to the rotating lever kinematic mechanism, move following the obligatory alignment movement of the glasses.

Once the alignment has been carried out, while the lens is therefore still locked between the prongs and counter-prongs of the aligner and resting on cables that support it, following this position that has been reached, the clamps are closed to tighten the aligned position.

In this way, it is possible to move the lower and upper pushers away to free the lens as this is now locked by the clamps in the aligned position and it is possible to shift the glasses bringing the aligned lens area into the measurement area 100 under the light beam.

A suitably programmed controller controls activation of the motors to manage all the above movements.

Thanks to this solution described, it is therefore possible to precisely align the lens and carry out a measurement distant from the pressers (70, 80) used for the alignment, thus also obtaining, in addition to a constructively simpler solution, a much more precise measurement not affected by shadows resulting from the pressors (70, 80).

The machine described also allows a more complex but more precise mapping to be carried out, i.e. a mapping made on a number (n) (with n>1) of alignments on different points and n reconstructions.

Basically, the procedure described above of alignment, gripping between the clamps and shifting under the measurement beam is carried out n times on different points of the same lens thereby producing a precise mapping. This procedure may be useful for lenses of the bifocal type, for example.

In a further, improved variant of the invention, a shifting system could be included such that, once the lens is aligned and gripped between the clamps, the cables (30, 31) that no longer have to support the glasses may disappear, thereby completely eliminating the risk of residual shadows due to presence of the cables on which the glasses rest.

This is possible since, according to the present solution, once the lens has been aligned it is gripped by the clamps and therefore the cables underneath can also be moved.

Without prejudice to what has been described, a cable shifting system can therefore be provided which intervenes when alignment is complete and with the clamps closed in order to remove the aforementioned cables (30, 31) from their position.

Figure 12:
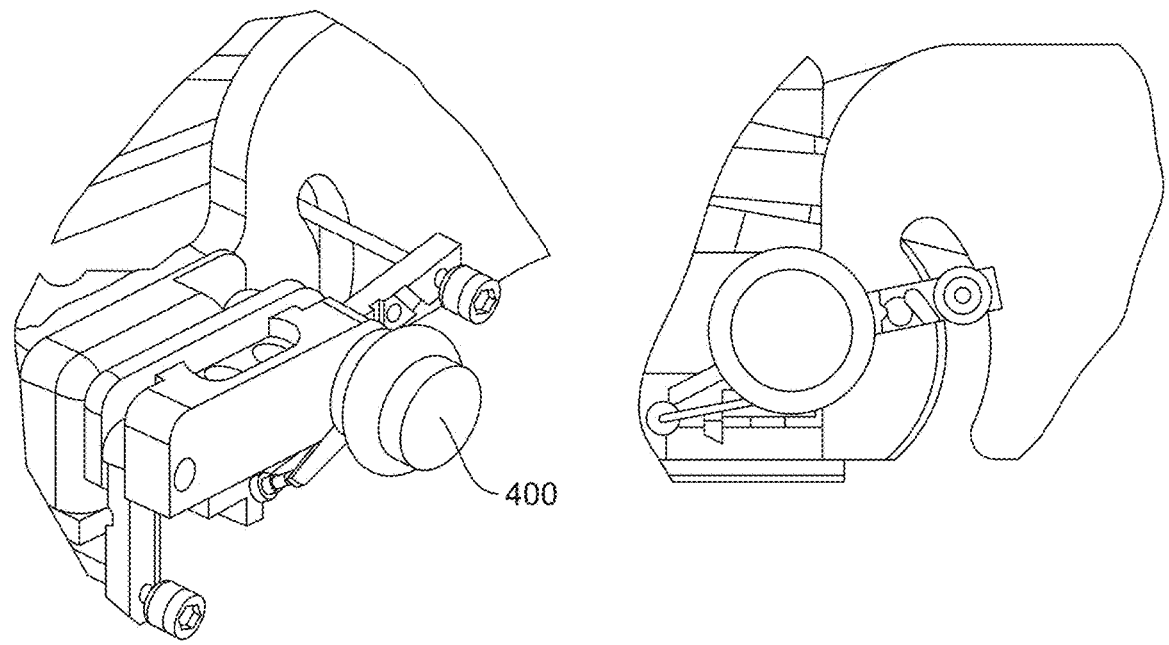
FIG. 12 shows a further improvement solution wherein a cable shifting system is described which allows the cables (30, 31) to be removed from their normal support position when the lens, once aligned, has been gripped between the clamps; According to this solution, the problem of shadows generated by the cables is further eliminated.
Figure 13:
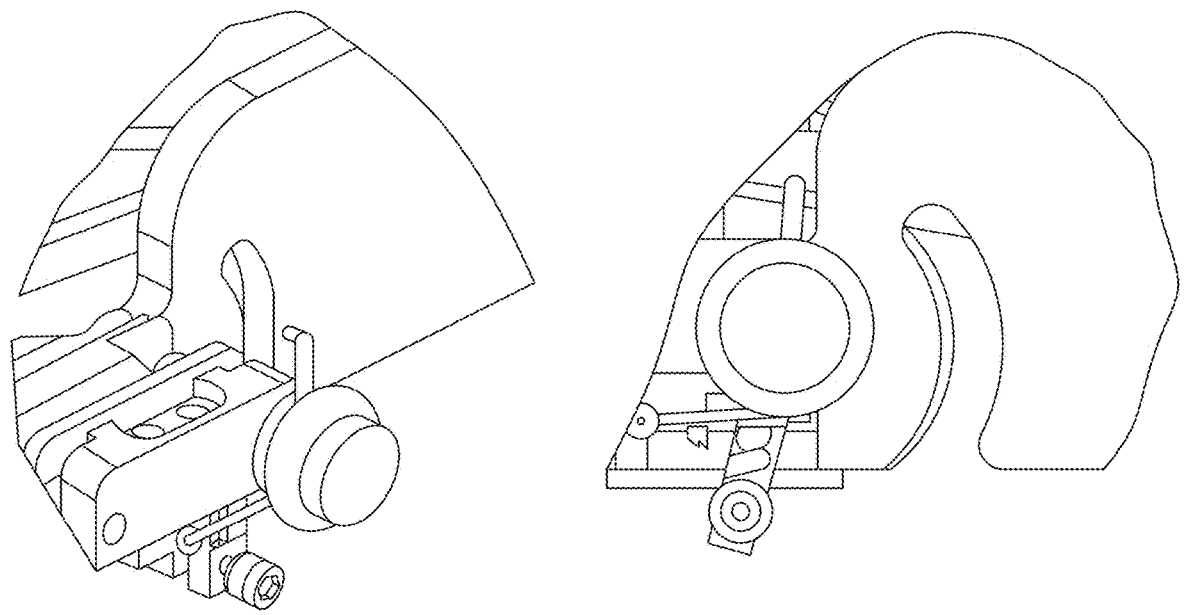

One possible solution is illustrated schematically in FIGS. 12 and 13.

In this case, each rod to which one end of the cable (30, 31) is connected can connect to a control knob 400. By rotating the knob 400 it is possible to pass from the condition of FIG. 12 to the condition of FIG. 13 in which the cable is placed under the plate 11.

An O-ring gasket is mounted on the knob 400, said gasket is elastic and may therefore be partially deformed in contact with a sliding surface.

Once the glasses lens is locked after alignment, the lens support wire will be partially or not at all pressed and at this point the system moves to a specific position on the XY plane where the O-ring is compressed on a plane while moving to the right. The O-ring sets the knob 400 in rotation and the wire begins to rotate.

In the solution shown in the figure, the spring connected to each rotating rod is not shown as, in this case, a torsional spring was used.

The machine described also allows, with a specific procedure, to be able to perform a measurement on a single lens and not necessarily on a lens belonging to a pair of glasses.

In this case, the procedure provides for the lens to be placed directly on the lower presser 70 for alignment.

The lens is placed and the alignment is carried out as described by trapping the single lens between the lower and upper pressers.

The clamps are already in the gripping position in open position, in such a way as to be able to grip and lock the lens between the clamps when the former is still locked between the pressers (70, 80).

The clamps can then be closed.

Only then are the pressers moved away so that the lens, aligned and locked in the aligned position between the clamps, is shifted into the measurement position.

The invention claimed is:

1. A machine for measuring optical properties of a lens for a pair of eyeglasses comprising:
    a light emitting system (150), configured to emit a light beam;
    a receiving system (100) arranged to receive said light beam and configured to analyze said received light beam; and
    an alignment system (70, 80) configured to arrange at least one part of said lens according to a predetermined aligned measuring position, said alignment system being activatable between a gripping position to carry out an alignment and a release position of the lens, the alignment system further cooperating with an assembly (11, 13, 14, 30, 31) configured to support the eyeglasses during alignment;

wherein said assembly (11, 13, 14, 30, 31) is further configured to lock the eyeglasses in said aligned measuring position, keeping the eyeglasses in said aligned measuring position after the alignment has been completed and with the alignment system in the release position, said alignment system (70, 80) being arranged a distance away from the light emitting system (150) so as not to be intercepted by the light beam emitted in use by said light emitting system, said assembly (11, 13, 14, 30, 31) being shiftable so as to move said eyeglasses under said light beam, keeping the eyeglasses, during shifting, locked in said aligned measuring position.

2. The machine according to claim 1, wherein said assembly (11, 13, 14, 30, 31) comprises:

a gripping system (13, 14, 16) configured to grip said eyeglasses, said gripping system being operable between an open position, wherein the gripping system leaves the eyeglasses free, and a closed position, wherein the gripping system grips and locks the eyeglasses;

a supporting system (30, 31), on which the eyeglasses are set, in use; and a support structure (11) connected to a shifting system and on which said gripping system (13, 14, 16) and said supporting system (30, 31) are arranged;

wherein said supporting system is movable independently of the gripping system in so as to enable a plurality of degrees of freedom of the eyeglasses resting thereon in use, following activation of the alignment system when the gripping system is arranged in the open position.

3. The machine, according to claim 1, wherein said alignment system (70, 80) comprises a lower element (70) and an upper element (80), and wherein at least one of said lower element and said upper element is movable towards another one of said lower element and said upper element in such a way as to trap the lens between said lower element and said upper element and carry out the alignment of the lens.

4. The machine, according to claim 2, wherein said supporting system comprises a first cable (30) and a second cable (31) arranged a distance away from each other to form a support for the eyeglasses, said first and said second cables being connected to a kinematic mechanism (50, 45, 46, 40a, 41a) configured in such a way that said first and second cables are movable, independently of the other.

5. The machine according to claim 4, wherein said kinematic mechanism comprises:

a first pair of levers (40a, 40b) each hinged rotatably at one end to a first fixed point and, at an opposite end, each of said levers of the first pair being connected to a point of the first cable (30) so that said first cable extends between the levers of said first pair of levers and is movable following a rotation of each of said levers of the first pair, further comprising first elastic means (48) arranged so as to elastically recall each one of said two-levers of the first pair towards a raised position;

a second pair of levers (41a, 41b) each hinged rotatably at one end thereof to a second fixed point and, at an opposite end, each of said levers of the second pair being connected to a point of the second cable so that said second cable (31) extends between the levers of said second pair of levers and is movable following a rotation of each one of said levers of the second pair, wherein second elastic means are further included, arranged in such a way as to elastically recall each one of said levers of the second pair towards a raised position.

6. The machine, according to claim 5, wherein the levers of the first pair are placed apart from each other and separate from each other so that each can rotate independently of the other, and wherein the levers of the second pair are also placed apart from each other and separate from each other so that each one can rotate independently of the other, said first and said second pair being hinged either to a support block (50), fixed to the support structure, or hinged directly to the support structure.

7. The machine, according to claim 5, wherein said first elastic means (48) comprise a spring for each of said levers of the first and the second pair, each spring being connected at one end to a fixed point belonging to a rod, and at an opposite end to said rod in such a way that upon rotation of said rod the spring is deformed, generating a recall force.

8. The machine, according to claim 2, wherein said gripping system (13, 14) comprises a first and a second plate, placed one in front of the other on the support structure, and wherein at least one of said first and said second plates is shiftable along said support structure in such a way as to be able to move towards/away from the other plate.

9. The machine, according to claim 8, further comprising movement means for operating the at least one of the first or the second plates according to a shifting motion, said movement means comprising an electric motor which rotatably activates a toothed wheel, said toothed wheel engaging with a rack fixed to said at least one of the first or the second plates in such a way that, according to a direction of rotation of said toothed wheel, a shifting of said at least one of the first or the second plates is generated in one direction or in an opposite direction.

10. The machine, according to claim 8, wherein the first and the second plates are both shiftable, further comprising a first rack connected to one of the first or the second plates and a second rack connected to another one of the first and the second plates, wherein said toothed wheel simultaneously engages with both racks in such a way that its rotation in one direction causes the plates to move away from each other and its rotation in the opposite direction causes the first and the second plates to approach each other.

11. The machine, according to claim 2, further comprising a control system which is programmed to bring the gripping system into the closed position only after the alignment has been completed and then to carry out a subsequent shifting of the support structure to bring the lens under said light emitting system, said control system being programmed to provide said activation of said alignment system and carry out said alignment when the gripping system is in said open position, and then carry out, after alignment has taken place, the activation of said gripping system in the closed position to lock the eyeglasses in the aligned position and perform said subsequent shifting of the support structure to bring the aligned lens under said light emitting system.

12. The machine, according to claim 4, further comprising a movement system (400) configured to remove the first and the second cables (30, 31) from a lens support position.

13. A method for measuring optical properties of a lens belonging to a pair of eyeglasses, the method comprising:

aligning a lens of the eyeglasses using an alignment system (70, 80) that arranges at least one portion of the lens to be in a measurement position, said alignment system being operable between a gripping position, wherein said alignment system comes into contact with the lens to carry out alignment, and a lens release position;

following completion of the step of aligning, locking of the eyeglasses to keep the lens in a measurement position obtained following release of the alignment system;

releasing the lens from said alignment system;

subsequently shifting the eyeglasses, maintaining said aligned position during shifting, to a measurement area located at a distance away from the alignment system; and subsequently generating a light beam, which intercepts the lens of the eyeglasses constrained in said measurement position and with the light beam, which is at a distance from the alignment system and in such a way that said light beam does not intercept said alignment system.

14. The method, according to claim 13, further comprising the steps of:

arranging a support structure (11) connected to a shifting system in such a way that the support structure can move at least along one horizontal plane (X, Y), on said support structure there being a gripping system (13, 14), configured to grip said eyeglasses, and a supporting system (30, 31) configured to support the eyeglasses, said gripping system being operable between an open position, wherein said gripping system leaves the eyeglasses free, and a closed position, wherein said gripping system grips and locks the eyeglasses, said supporting system being movable independently of said gripping system to enable a plurality of degrees of freedom on the eyeglasses, resting thereon in use, when the gripping system is in an open configuration;

setting the eyeglasses on said supporting system;

aligning the eyeglasses by arranging the gripping system in the open position to free the eyeglasses and activating the alignment system that traps the lens to be aligned between a lower element (70) and an upper element (80) so as to cause, following its entrapment, an alignment of the lens resting on cables of the supporting system through a movement of the supporting system that follows a movements of the lens;

locking the eyeglasses in the aligned position through activation of said gripping system in the closed position; and subsequently shifting the supporting system in such a way as to shift the lens to be measured under said light beam.

* * * * *